May 6, 1952   J. ROSENBERG   2,595,486
SERVOMOTOR AND MECHANISM FOR LIMITING ITS PISTON
MOVEMENTS AT VARIABLY PREDETERMINED POSITIONS
Filed Feb. 12, 1949
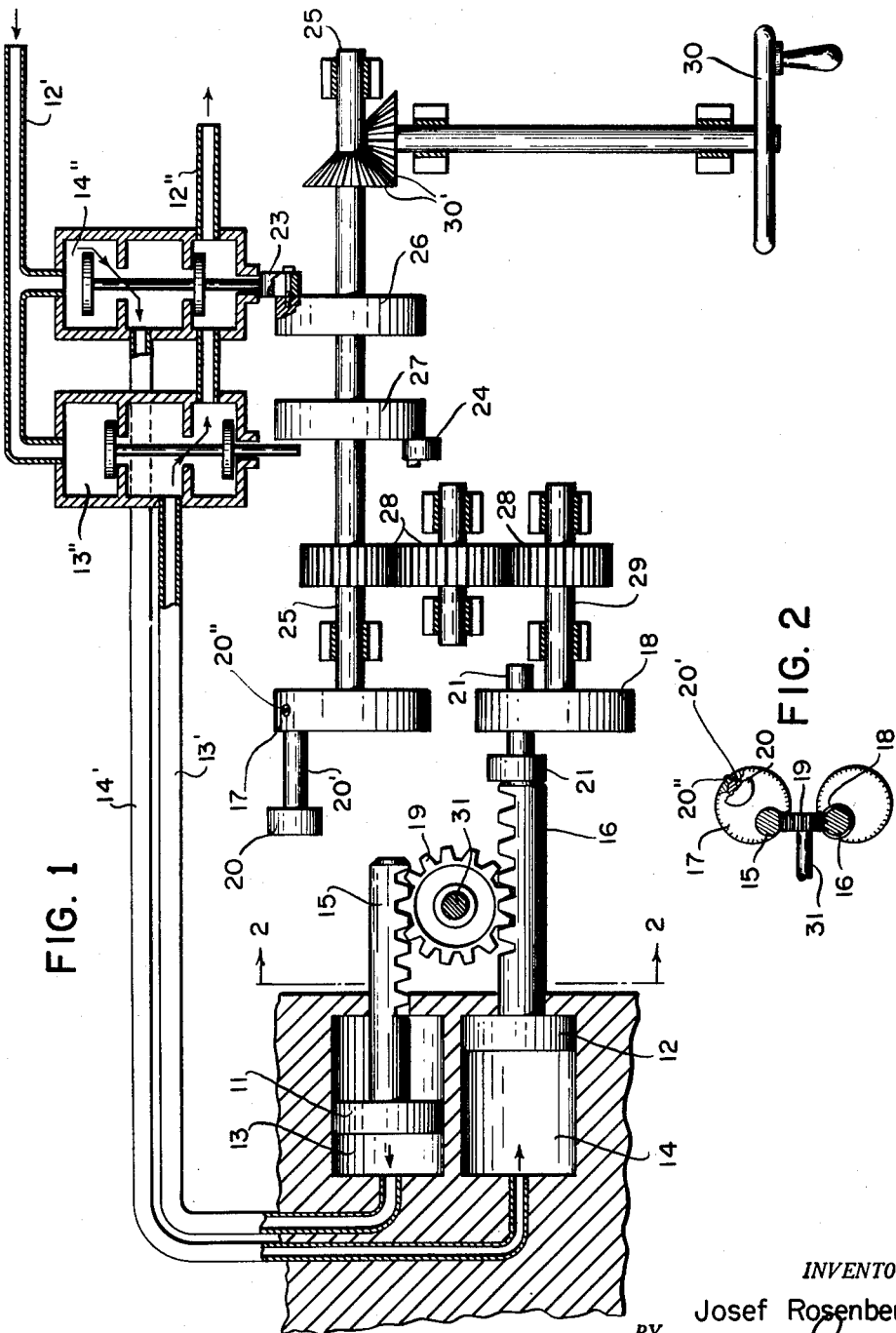
INVENTOR.
Josef Rosenberg
BY
ATTORNEY Patented May 6, 1952

2,595,486

UNITED STATES PATENT OFFICE 2,595,486

SERVOMOTOR AND MECHANISM FOR LIMITING ITS PISTON MOVEMENTS AT VARIABLY PREDETERMINED POSITIONS

Josef Rosenberg, Pilsen, Czechoslovakia, assignor to Škoda Works, National Corporation, Pilsen, Czechoslovakia Application February 12, 1949, Serial No. 76,014
In Czechoslovakia March 6, 1948

3 Claims. (Cl. 121—38)

My invention relates to servomotors and mechanisms connected therewith for limiting the movement of the pistons of said servomotors at variably predetermined positions. Such devices may be used to effect a predetermined relative rotation of the driving shaft in regulating devices for example in speed changing devices of machine tools, in devices for the adjustment of brushes in electric commutator motors, in devices for changing the eccentricity (lift) in hydraulic transmissions, and for many other purposes.

The main object of this invention is to create a servomotor with an operating mechanism connected therewith which will permit to move the pistons of the servomotor into predetermined varying positions during the operation of the machine in order to regulate the same.

The said and other objects of my invention will be more fully understood from the following specification when taken with the accompanying drawing in which one embodiment of my invention is diagrammatically illustrated. In the drawing Fig. 1 shows the general layout of the device in a sectional view and Fig. 2 shows in a smaller scale a partial cross-sectional view along line 2—2 of Fig. 1.

The same reference characters indicate the same parts in both figures.

My new device comprises a servomotor having two pressure cylinders 13, 14 arranged side by side into which any suitable pressure medium such as compressed air or liquid is introduced through the conduits 13', 14', respectively, to act upon one side of the pistons 11, 12, respectively. The flow of the pressure medium through said conduits 13', 14' into one or the other of said cylinders 13, 14 is governed by the three-way valve combination 13", 14" into which the pressure medium enters through the inlet pipe 12' and from which it is discharged through the outlet pipe 12".

Each of said pistons 11, 12 is connected with a toothed piston rod or rack 15, 16, respectively, which gear with an intermediately arranged pinion 19. This pinion 19 is keyed upon a shaft 31 which operates any desired regulating device for example in speed changing devices of machine tools, in devices for the adjustment of brushes in electric commutator motors, in devices for changing the eccentricity (lift) in hydraulic transmissions, and in other devices. The free ends of the piston rods or racks 15, 16 cooperate with adjustable stop members 20, 21 respectively, which limit and control the axial displacements of one of said rods or racks and thereby also control the degree of rotation of the pinion 19 driving the operating shaft 31 of the regulating device. Said stop members 20, 21 are supported by their bolts 20', 21', respectively, which are mounted for longitudinal adjustment in rotatable setting discs 17, 18, respectively, and fixed therein in any desired manner for example by a set screw 20". The setting discs 17, 18 are keyed upon their respective shafts 25, 29 which are interconnected by the three-wheel gearing 28 so that both discs rotate in the same direction and at the same speed.

The shaft 25 is extended and carries two additional discs 26, 27, each of which is provided with an adjustable projection or cam 23, 24, respectively, which operate the three-way valves 13", 14" controlling the conduits 13', 14', respectively so that one of the valves, for example valve 14" as shown, permits pressure medium to enter the cylinder 14 whereas the other valve (13') allows the pressure medium to escape from the cylinder 13 through the outlet pipe 12". The said projections or cams 23, 24 are held to their respective discs 26, 27 for example by set screws as shown to permit their proper adjustment relative to the valve rods. One or the other of the stop members 20, 20', and one or the other disc 26 or 27 with their respective cams 23, 24 is brought into operating position by turning the shaft 25. This turning of the shaft 25 may be effected by any suitable means for example by the bevel gear 30' which is operated by the handwheel 30 arranged to be easily reached by the operator of the machine. If my device is used in combination with automatic machine tools then the shafts 25, 29 may be directly connected to the control mechanism of said machine tools for example to the cam shaft in automatic lathes.

My new device will operate as follows: The cams 23, 24 are adjusted upon their respective discs 26, 27 to properly actuate the valve rods of the three-way valves 13", 14" so that the pressure medium flowing into said valves will enter into one of the two cylinders 13, 14 to act upon its respective piston (for example upon piston 12 in cylinder 14 as shown) while the other cylinder is connected with the outlet pipe 12". The stop members 20, 21 are adjusted upon their respective discs 17, 18 to limit in any desired degree the longitudinal displacement of the piston rods or racks 15, 16 when their respective piston is exposed to the pressure medium. In the drawing the stop member 21 is shown cooperating with the piston rod 16 while the stop member 20 is removed from cooperation with the piston rod 15. By turning the shaft 25 by means of the bevel gear 31' which is operated by the handwheel 30 the cam 23 and the stop member 21 may be removed from the shown operative positions and the cam 24 and the stop member 20 may be brought into operative position. As shown the stop member 20 will permit a greater longitudinal displacement of the piston rod 15 than the stop member 21 to the piston rod 16. As explained above the stop members 20, 21 may be longitudinally adjusted in their respective discs 17, 18 and thus the degree of displacement of the piston rods 15, 16 changed. As the toothed piston rods or racks 15, 16 engage the pinion 19 the degree of their displacement will effect a certain correspondingly variable rotation of said pinion 19 and therefore of its shaft 31 which operates any desired regulating device as described above.

While one form of my invention has been shown and described it will be well understood that my invention may be constructed in various other embodiments which come within the scope of the appended claims.

What I claim as my invention is:

1. Servomotor with mechanism for producing predetermined relative rotations of the driving shaft in regulating devices comprising a pinion driving said shaft, two cylinders arranged side by side, a piston reciprocating in each cylinder, a rack operated by each piston, said racks meshing said pinion in opposing positions, a longitudinally adjustable stop member for each rack to control its longitudinal displacement, a rotatable support for each of the stop members to bring the same alternately in operating position relative to the respective rack, a conduit for a pressure medium to each of the said cylinders, controlling means in each conduit for the supply of pressure medium to alternately operate said cylinders, and means alternately operating said controlling means in timely relation with said rotatable supports for said stop members to bring one stop member in operating position.

2. Servomotor with mechanism for producing predetermined relative rotations of the driving shaft in regulating devices comprising a pinion driving said shaft, two cylinders arranged side by side, a piston reciprocating in each cylinder, a rack operated by each piston, said racks meshing said pinion in opposing positions, a longitudinally adjustable stop member for each rack to control its longitudinal displacement, a rotatable support for each of the stop members to bring the same alternately in operating position relative to the respective rack, a conduit for a pressure medium to each of said cylinders, three-way valves in each conduit for controlling the supply of pressure medium to alternately operate said cylinders, and means alternately operating said valves in timely relation with said rotatable supports for said stop members to bring one stop member in operating position.

3. Servomotor with mechanism for producing predetermined relative rotations of the driving shaft in regulating devices comprising a pinion driving said shaft, two cylinders arranged side by side, a piston reciprocating in each cylinder, a rack operated by each piston, said racks meshing said pinion in opposing positions, a longitudinally adjustable stop member for each rack to control its longitudinal displacement, a rotatable support for each of the stop members to bring the same alternately in operating position relative to the respective rack, a conduit for a pressure medium to each of said cylinders, three-way valves in each conduit for controlling the supply of pressure medium to alternately operate said cylinders, adjustable cams mounted upon rotatable timing discs to operate said valves in timely relation with said rotatable supports for said stop members to bring one stop member in operating position, and means to operate said timing discs.

JOSEF ROSENBERG.

REFERENCES CITED

The following references are of record in the file of this patent:

UNITED STATES PATENTS

| Number | Name | Date |
| --- | --- | --- |
| 524,541 | Dewson | Aug. 14, 1894 |
| 1,800,982 | Bullard et al. | Apr. 14, 1931 |
| 1,806,669 | Campbell | May 26, 1931 |
| 1,965,751 | Rush | July 10, 1934 |
| 2,339,001 | Clay et al. | Jan. 11, 1944 |
| 2,436,190 | Boisseau et al. | Feb. 17, 1948 |